Patented Oct. 27, 1953

2,657,203

UNITED STATES PATENT OFFICE 2,657,203

MONOAZO DYESTUFFS OF THE PYRAZOLONE SERIES

Willy Widmer, Bottmingen, and Alfred Fasciati, Basel, Switzerland, assignors to Ciba Limited, Basel, Switzerland, a Swiss firm No Drawing. Application June 1, 1950, Serial No. 165,606. In Switzerland July 18, 1949

9 Claims. (Cl. 260—162)

According to this invention valuable new monoazodyestuffs of the pyrazolone series are made by coupling a diazo compound of an amine of the general formula (I)
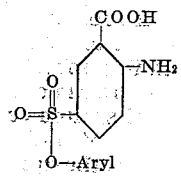

with a pyrazolone.

Especially valuable products are obtained, for example, from diazo compounds of amines of the formulae (IIa)
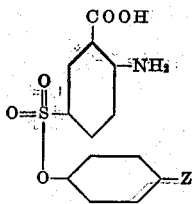

(IIb)
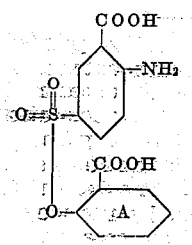

in the first of which Z represents a substituent incapable of salt formation and in the second of which the benzene nucleus A may, if desired contain a further substituent incapable of salt formation.

The 2-aminobenzene-1-carboxylic acid-5-sulfonic acid esters corresponding to the above formulae I, IIa and IIb used as starting materials in the present process can be made by reacting a 2-chlorobenzene-1-carboxylic acid-5-sulfonic acid chloride with an aromatic hydroxyl compound, such, for example, as hydroxybenzene, 4-tertiary amyl-1-hydroxybenzene or especially with 2-hydroxybenzene-1-carboxylic acid or such substitution products of 1-hydroxybenzene-1-carboxylic acid as contain substituents incapable of salt formation, such, for example as a methyl group, and replacing the chlorine atom in the resulting product by the —NH₂ group.

As examples of 2-aminobenzene-1-carboxylic acid-5-sulfonic acid esters which can be used as starting materials in the present process and are obtainable in the manner described in the preceding paragraph, there may be mentioned: 2-aminobenzene-5-sulfonic acid phenyl ester-1:2'-dicarboxylic acid, 2-aminobenzene-5-sulfonic acid-(4'-methyl)-phenyl ester-1:2'-dicarboxylic acid, 2-aminobenzene-5-sulfonic acid phenyl ester-1-carboxylic acid, 2-aminobenzene-5-sulfonic acid-(3'- or 4'-methyl)-phenyl ester-1-carboxylic acid, 2-aminobenzene-5-sulfonic acid-(4'-secondary butyl)-phenyl ester-1-carboxylic acid, 2-aminobenzene-5-sulfonic acid-(4'-tertiary amyl)-phenyl ester-1-carboxylic acid, 2-aminobenzene-5-sulfonic acid-(4'octyl)-phenyl ester-1-carboxylic acid of the formula

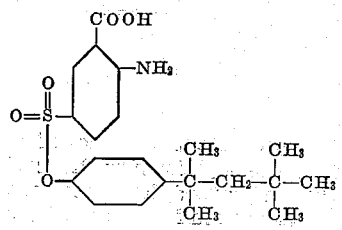

2-aminobenzene-5-sulfonic acid-(4'-chloro)-phenyl ester-1-carboxylic acid, 2-aminobenzene-5-sulfonic acid-naphthyl-(2')-ester-1-carboxylic acid and 2-aminobenzene-5-sulfonic acid naphthyl-(1')-ester-1-carboxylic acid-4'-sulfonic acid.

The pyrazolones also used as starting materials in the present process may be, for example, 3-methyl-5-pryazolones or 5-pyrazolone-3-carboxylic acids. There come into consideration more especially 1-aryl-3-methyl-5-pyrazolones and among these preferably 1-phenyl-3-methyl-5-pyrazolones. The aryl or phenyl radical in these compounds may be free from or may contain substituents.

When diazo compounds of amines of the above formula IIb are used as starting materials, very valuable dyestuffs are obtained, for example, from 1-phenyl-3-methyl-5-pyrazolones which are free from substituents imparting solubility, to which belong, for example, sulfonic acid, carboxyl and sulfonic acid amide groups. But when diazo compounds of amines of the formula IIa are used, the pyrazolones preferably may contain such a substituents imparting solubility and capable of salt formation.

As examples of pyrazolone compounds the following may be mentioned: 3-methyl-5-pryazolone, 1-phenyl-3-methyl-5-pryazolone, 1-(2'-chloro)-phenyl-3-methyl-5-pyrazolone, 1(2':5'-dichloro)-phenyl-3-methyl-5-pyrazolone, 1-(3'- nitro)-phenyl-3-methyl-5-pyrazolone, 1-(3'-sulfo)-phenyl-3-methyl-5-pyrazolone, 1-(2'-chloro-5'-sulfo)-phenyl-3-methyl-5-pyrazolone, 1-(4'-sulfo)-1'-naphthyl-3-methyl-5-pyrazolone, 1-(3'-sulfonamido)-phenyl-3-methyl-5-pyrazolone, 1-(3'-carboxy)-phenyl-3-methyl-5-pyrazolone and 1-phenyl-5-pyrazolone-3-carboxylic acid.

The diazotization of the amines coming into consideration as starting materials in the present process may be carried out by methods in themselves known, and advantageously by the so-called indirect method, that is to say by coupling a solution, which contains an alkali salt of the component to be diazotized and the necessary quantity of nitrate, with a dilute solution of acid containing a quantity of acid, especially hydrochloric acid, in excess of that theoretically required.

The coupling is advantageously carried out in an alkaline medium in the present process. Thus, for example, the pyrazolone used as coupling component may be dissolved in the necessary quantity of alkali hydroxide and introduced into the excess of alkali in the form of an alkali carbonate necessary for the coupling reaction. If desired the coupling may also be carried out with the addition of a neutral or basic solvent such, for example, as alcohol, pyridine, ethanolamine or the like.

The monoazo dyestuffs of the pyrazolone series obtainable by the present process are new. They correspond to the general formula (III)
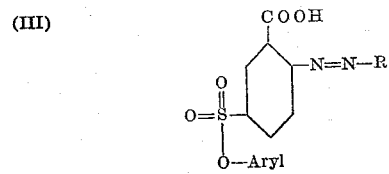

in which R represents the radical of a 5-pyrazolone bound in the 4-position to the azo linkage.

As will be understood from the foregoing description, those dyestuffs are especially valuable, for example, which correspond to the formula (IV)
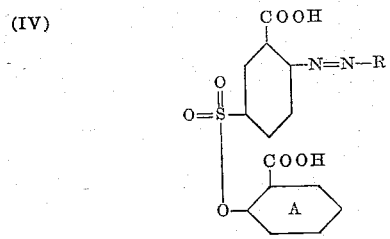

in which the benzene nucleus A may, if desired, contain further substituents incapable of salt formation.

The new dyestuffs can be used for dyeing or printing various materials, but principally those of animal origin such as wool, silk or leather, and materials composed of artificial fibers of superpolyamides or superpolyurethanes. Especially valuable results are obtained by treating the dyestuffs obtainable by the present process with agents yielding metal. The treatment may be carried out in known manner in substance, in the dyebath or on the fiber. Thus, metallization in substance may be carried out, for example, with agents yielding chromium in a weakly acid, neutral or alkaline medium, and if desired in the presence of suitable additions, for example, aromatic ortho-hydroxy-carboxylic acids, or bases, organic solvents such as alcohols, or additions favoring the formation of complexes, and under atmospheric or superatmospheric pressure. Metallization in the dyebath or on the fiber may also be carried out in known manner, for example, by the known after-chroming processes.

The new dyestuffs are, as a rule, suitable fore dyeing by the process in which dyeing is carried out in a single bath with a solution which contains, in addition to the dyestuff, an alkali chromate and ammonium sulfate.

The following examples illustrate the invention, the parts and percentages being by weight unless otherwise stated and the relationship of parts by weight to parts by volume being the same as that of the kilogram to the liter:

*Example 1*

33.7 parts of 2-aminobenzene-5-sulfonic acid phenyl ester-1:2'-dicarboxylic acid are dissolved in 400 parts of water and 8 parts of sodium hydroxide. 6.9 parts of sodium nitrite are added to the solution, and the latter is then slowly introduced in portions at 5–8° C. into 100 parts by volume of a 5N-solution of hydrochloric acid.

Sufficient sodium carbonate is added to the suspension of the diazo compound to produce only a weakly acid reaction to Congo, and the whole is added at 5–10° C. to a solution of 17.4 parts of 1-phenyl-3-methyl-5-pyrazolone in 500 parts of water and 25 parts of sodium carbonate.

The whole is stirred at 8–10° C. until the diazo reaction disappears, the dyestuff is completely precipitated by the addition of sodium chloride, separated by filtration and dried. It corresponds to the formula

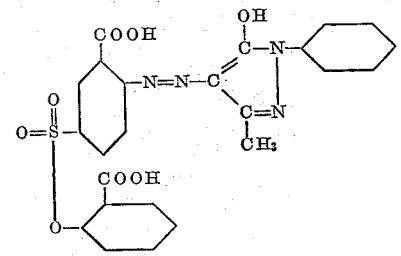

The dyestuff is a yellow powder which dissolves in dilute sodium carbonate solution with a yellow coloration, in pure concentrated sulfuric acid with a greenish yellow coloration and dyes wool from an acetic acid bath yellow tints, which when afterchromed are transformed into a very fast brownish yellow. The dyestuff is also excellently suited for dyeing by the single bath chroming process, and in this case also very fast slightly brownish yellow tints are obtained.

The 2-aminobenzene-5-sulfonic acid phenyl ester-1:2'-dicarboxylic acid may be prepared as follows:

156.5 parts of 2-chlorobenzene-1-carboxylic acid are slowly introduced at room temperature, while stirring, into 350.0 parts of chlorosulfonic acid, and the mixture is heated at 95–100° C. for 4 hours. The solution so obtained is then poured on to 1500 parts of ice, while stirring, and the resulting white precipitate of 2-chlorobenzene-5-sulfonic acid chloride-1-carboxylic acid is separated by filtering with suction and washed with ice water.

The 2-chlorobenzene-5-sulfonic acid chloride-1-carboxylic acid so obtained is suspended in 1000 parts of ice water, and mixed with 138.0 parts of 2-hydroxybenzene-1-carboxylic acid. A solution of sodium hydroxide of 38 per cent. strength is slowly added in portions to the suspension, while stirring energetically, until the reaction is weakly but permanently alkaline to phenolphthalein. The temperature rises to 35° C. The whole is allowed to cool from 35° C. to 20° C. for a few hours, while stirring, the resulting solution is then acidified with concentrated hydrochloric acid, and the product thereby precipitated is separated by filtration and washed with water. The dried product is treated with 600 parts by volume of ammonia solution of 24 per cent. strength and 4 parts of copper powder in an autoclave for 2 hours at 135–130° C.

The resulting brownish solution is acidified with hydrochloric acid, and the precipitated product is separated by filtration, washed with water and dried.

*Example 2*

36.3 parts of 2-aminobenzene-5-sulfonic acid-(4'-tertiary amyl)-phenyl ester-1-carboxylic acid are dissolved in 400 parts of water and 4 parts of sodium hydroxide. 6.9 parts of sodium nitrite are added to the solution and then the latter is introduced in portions at 5–8° C. into 100 parts by volume of a 5N-solution of hydrochloric acid.

A quantity of sodium carbonate is added to the suspension of the diazo compound sufficient only to produce a reaction weakly acid to Congo, and the whole is added at 5–10° C. to a solution of 25.4 parts of 1-(3'-sulfo)-phenyl-3-methyl-5-pyrazolone in 500 parts of water and 25 parts of sodium carbonate.

The whole is stirred at 8–10° C. until the diazo reaction disappears, and the dyestuff is completely precipitated by the addition of sodium chloride, separated by filtration and dried. It corresponds to the formula

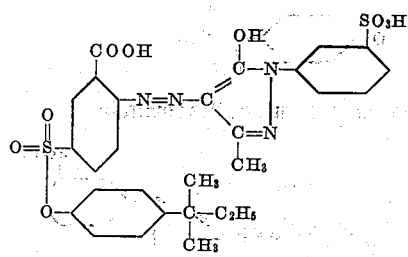

The dyestuff is a yellow powder which dissolves in dilute sodium carbonate solution with a yellow coloration and in pure concentrated sulfuric acid with a greenish yellow coloration, and dyes wool from an acetic acid bath pale yellow tints which, when after-chromed, are transformed into very fast yellow tints. The dyestuff is also excellently suited for dyeing by the single bath chroming process, in which case very fast yellow tints are also obtained.

Dyestuffs, which yield on wool yellow tints having very good properties of fastness by the after-chroming process, are obtained by coupling in the manner described above diazotized 2-aminobenzene-5-sulfonic acid phenyl ester-1:2'-dicarboxylic acid with 1-(2':5'-dichloro)-phenyl-3-methyl-5-pyrazolone, or 1-phenyl-3-methyl-5-pyrazolone-3'-sulfonic acid amide or 3-methyl-5-pyrazolone.

Further valuable dyestuffs, which also yield fast yellow dyeings on wool when after-chromed, are given in the following table. These dyestuffs are also advantageously prepared in the manner described in this example.

| Diazo-component | Coupling component |
|---|---|
| 2-aminobenzene-5-sulfonic acid-(4'-methyl)-phenyl ester-1:2'-dicarboxylic acid. | 1-phenyl-3-methyl-5-pyrazolone. |
| 2-aminobenzene-5-sulfonic acid-(4'-octyl)-phenyl ester-1-carboxylic acid of the formula 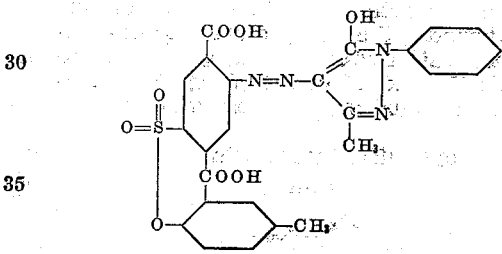 | 1-(3'-sulfo)-phenyl-3-methyl-5-pyrazolone. |
| 2-aminobenzene-5-sulfonic acid-(4'-methyl)-phenyl ester-1-carboxylic acid. | 1-(3'-sulfo)-phenyl-3-methyl-5-pyrazolone. |
| 2-aminobenzene-5-sulfonic acid-(4'-chloro)-phenyl ester-1-carboxylic acid. | 1-(3'-sulfo)-phenyl-3-methyl-5-pyrazolone. |

The diazo components mentioned in the above table can all be prepared by the method described in the latter part of Example 1.

The first dyestuff of the table corresponds to the formula

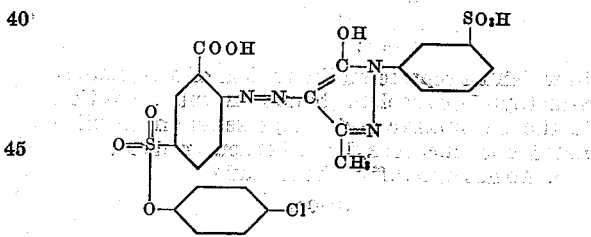

and the last dyestuff of the table to the formula

*Example 3*

A dyebath is prepared which contains, in 4000 parts of water, 1.5 parts of potassium chromate, 1.5 parts of ammonium sulfate, 10 parts of crystalline sodium sulfate and 1.5 parts of the dyestuff obtained as described in Example 1.

100 parts of well wetted wool are entered into the dyebath at 60° C., the temperature is raised to the boil in the course of 30 minutes and maintained at the boil for 45 minutes. 0.5 part of acetic acid of 40 per cent. strength are then added and boiling is continued for a further 45 minutes. The wool is dyed a fast brownish yellow tint.

*Example 4*

In a dyebath which contains in 4000 parts of water, 1.5 parts of the dyestuff obtained as described in Example 2, 4 parts of acetic acid of 40 per cent. strength and 10 parts of crystalline sodium sulfate are entered, at 60 C., 100 parts of well wetted wool. The temperature is raised to the boil in the course of 30 minutes and dyeing is carried on at the boil for 45 minutes. There are then added 5 parts of sulfuric acid of 10 per cent. strength and dyeing is continued at the boil for 15 minutes. The dyebath is then cooled to about 70° C., 1 part of potassium bichromate is added, the whole is raised to the boil, and chroming is carried on for 40 minutes at the boil. The wool is dyed a fast brownish yellow tint.

What we claim is:
1. An azo dyestuff of the formula

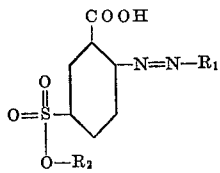

in which $R_1$ represents the radical of a 3-methyl-5-pyrazolone bound in the 4-position to the azo linkage, and $R_2$ represents a benezene radical.

2. An azo dyestuff of the formula

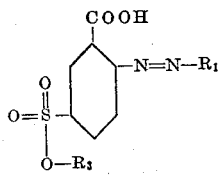

in which $R_3$ represents a benzene radical which contains a carboxylic acid group as the single substituent imparting solubility in water and which is bound to the oxygen atom in ortho-position to the said carboxylic acid group, and $R_1$ represents the radical of a 1-phenyl-3-methyl-5-pyrazolone bound in the 4-position to the azo linkage.

3. An azo dyestuff of the formula

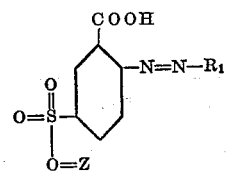

in which $R_1$ represents the radical of a 1-phenyl-3-methyl-5-pyrazolone bound in the 4-position to the azo linkage and Z represents an unsulfonated and uncarboxylated benzene radical.

4. An azo dyestuff of the formula

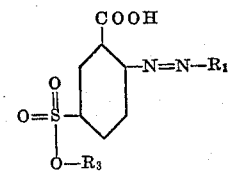

in which $R_3$ represents a benzene radical which contains a carboxylic acid group as sole substituent imparting solubility in water and which is bound to the O-atom in ortho-position to the said carboxylic acid group, and $R_1$ represents the radical of a 1-phenyl-3-methyl-5-pyrazolone which is unsulfonated and uncarboxylated.

5. An azo dyestuff of the formula

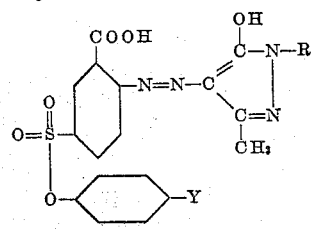

in which Y represents a substituent selected from the group consisting of a chlorine atom, a methyl and a tertiary amyl group and R represents a phenyl radical which contains a substituent imparting solubility in water.

6. The azo dyestuff of the formula

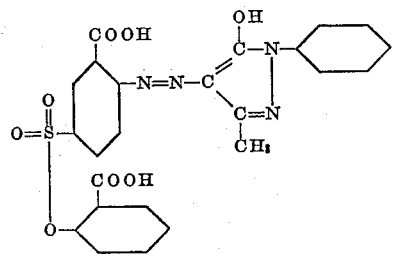

7. The azo dyestuff of the formula

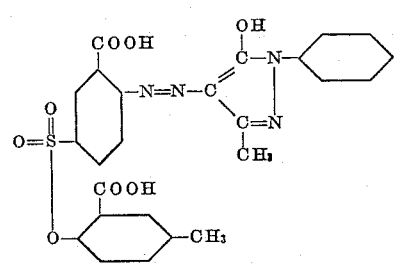

8. The azo dyestuff of the formula

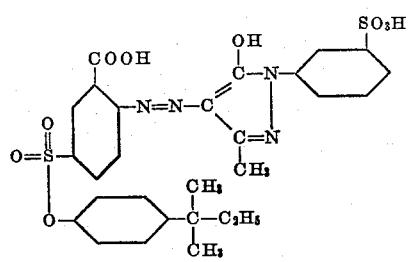

9. The azo dyestuff of the formula

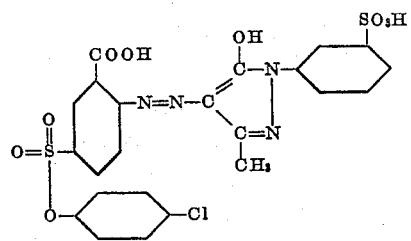

WILLY WIDMER.
ALFRED FASCIATI.

References Cited in the file of this patent
UNITED STATES PATENTS

| Number | Name | Date |
|---|---|---|
| 1,646,785 | Duisberg et al. | Oct. 25, 1927 |
| 1,676,697 | Kaltwasser et al. | July 10, 1928 |
| 2,073,728 | Bohi | Mar. 16, 1937 |

FOREIGN PATENTS

| Number | Country | Date |
|---|---|---|
| 26,908 | Great Britain | 1913 |
| 30,055 | Great Britain | 1913 |